Jan. 16, 1962     R. E. BARNES     3,017,568
SHARP CUT-OFF SPARK GAP INDICATOR
Filed Feb. 14, 1958
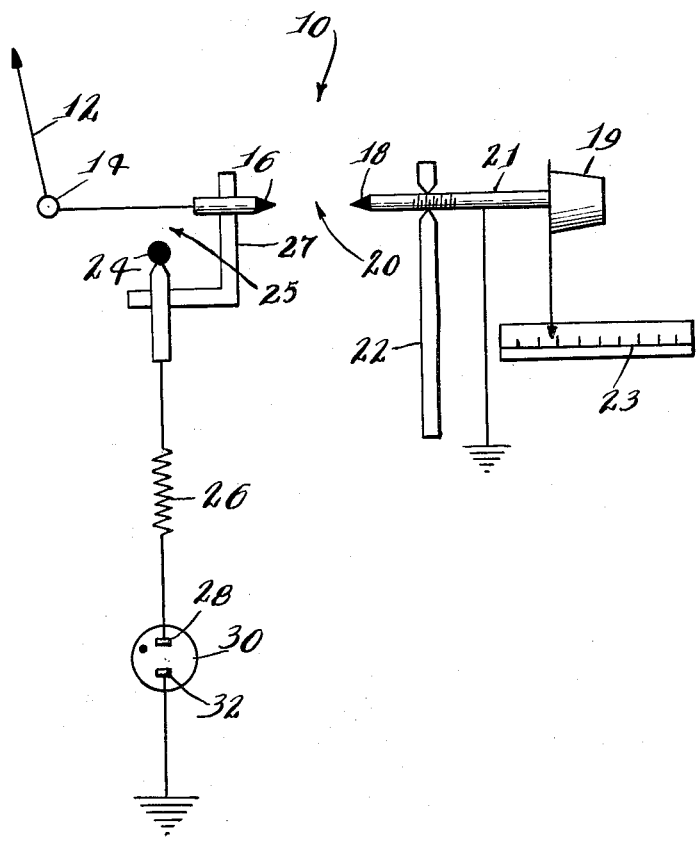
Inventor.
Robert E. Barnes.
By. Zabel, Baker, York, Jones & Dithmar
Attorneys.

3,017,568
SHARP CUT-OFF SPARK GAP INDICATOR
Robert E. Barnes, 114 E. Grove St., Algona, Iowa
Filed Feb. 14, 1958, Ser. No. 715,307
3 Claims. (Cl. 324—18)

This invention relates to a device for precisely determining the length of a spark gap when a misfire occurs and more particularly to a device for testing the condition of high voltage components of an automobile ignition system.

Spark gap measuring devices are used to determine the effectiveness of the different components of an automotive ignition system, such as the efficiency of the high voltage coils, condensers, or the spark plugs. Heretofore these spark gap measuring devices comprised two electrodes positioned opposite to each other. One of these electrodes was adjustable with respect to the other so that the spacing between them could be altered. A scale was provided for indicating the separation distance. One of the electrodes, usually the fixed one, was connected to a high voltage line extending from the component being tested, and the other electrode was grounded. Next the electrodes were moved toward each other until a continuous sparking occurred between them. Then they were slowly moved apart until a condition of misfiring occurred. At the misfiring point the spacing between the electrodes was measured, and this was compared with the performance of a standard component under similar conditions to give an indication of the merit of the component being tested.

Such prior devices depended upon visual observation of the spark gap. For that reason, the determination of the spark gap setting where misfiring first began to occur lacked precision, and this introduced objectionable errors in the evaluation of the component being tested. Furthermore the error usually made it appear that the component was more efficient and in better condition than it actually was. This cost the serviceman valuable time if he was trying to trace a difficulty in the ignition system, and when the defect was not so severe as to render the car inoperative it raised the possibility of trouble occurring at a later date. In addition, this often cost the serviceman an opportunity to make a sale for the replacement of the defective part.

What is needed therefore and comprises the principal object of this invention is a test device for accurately comparing the performance of a high voltage component with the performance of a standard component.

A further object of the invention is to provide a test device for precisely determining the length of a spark gap at which misfiring begins to occur so that the efficiency of the various components of the ignition system can be measured accurately.

Another object of the invention is to provide a test apparatus for the measurement of circuit components in an ignition system which is simple and inexpensive to manufacture and foolproof to operate.

These and other objects of the invention will become more apparent when read in the light of the accompanying specification and drawing.

The single figure of the drawing is a schematic representation of a circuit and various components of a spark gap indicator constructed according to the principles of this invention.

Referring now to the drawing, an apparatus or circuit for testing the performance of high voltage components in an ignition system and indicated generally by the reference numeral 10 includes a high voltage line 12 which extends from a component being tested (not shown). Line 12 is connected to terminal 14 of a needle point electrode 16 which is rigidly mounted on a suitable support 27. A second needle point electrode 18 is grounded and disposed in spaced relation to electrode 16, and positioned so that the points of the electrodes face each other. This defines a main spark gap 20. As seen in the drawing, electrode 18 includes means such as handle 19 and stem 21 which is adjustably mounted on a support 22 so that electrode 18 can be moved toward and away from electrode 16 to vary the length of spark gap 20.

A radius point or spherical electrode 24 also is mounted on support 27 at a fixed distance from the point of electrode 16 and is at a lower potential defining thereby a second spark gap 25 with electrode 16.

The needle point configuration of electrodes 16 and 18 provides a substantially lower resistance to discharge per unit of separation length than exists in second spark gap 25, because the second spark gap is defined both by a spherical electrode and a needle point electrode which faces or points away from it. For that reason spherical electrode 24 can be positioned relatively close to needle point electrode 16 without affecting the discharge in main spark gap 20. This position is governed by a requirement that it cause high voltage electrode 16 to discharge across second spark gap 25 whenever main spark gap 20 fails to fire. Since electrode 24 is connected in series with a voltage drop protective resistor 26 and terminal 28 of the neon glow lamp 30, the other terminal 32 being grounded, whenever electrode 16 discharges in spark gap 25, the resulting difference in voltage between lamp terminals 28 and 32 will cause the glow lamp to flash or glow more brightly than normal and indicate this fact.

In operation the high voltage from the component being tested is connected through line 12 and terminal 14 to needle point electrode 16. Handle 19 and threaded stem 21 of electrode 18 is rotated in support 22 to move the points of electrodes 16 and 18 close enough together so that a steady discharge occurs in the main spark gap 20. Then adjustable electrode 18 is backed away slowly from electrode 16 until the resistance to discharge between these electrodes increases to a value greater than the resistance to discharge in the second spark gap. As this value is approached misfires will occur in the main spark gap as evidenced by the flashing in the neon glow lamp. The length of the main gap at which misfiring occurs can be sharply determined because the resistance to discharge in the main spark gap does not increase extremely sharply with increasing distance between the electrodes in view of their needle point configuration. Since the approach to a misfire condition in the main spark gap is gradual, the exact point where misfire beings can be precisely located. The length of the main spark gap at which this misfiring begins can be measured by using any suitable scale or calibrating instrument 23 which may be provided. This length can then be compared with the performance of a standard component, and if the length of the gap at misfire is less than the corresponding value obtained from a standard component, the test component will then be judged inadequate.

As stated above, the lowered resistance to discharge in main spark gap 20, in comparison to second spark gap 25 is due to the configuration of the electrodes, but under some circumstances these differences may be achieved by a careful selection of the medium between the electrodes in both spark gaps. In addition, the misfire in the main spark gap which indicates the merit of the component being tested occurs because the spacing between the electrodes is increased, but it may be possible to design a high voltage component testing apparatus which keeps the spacing between the electrodes in the spark gaps fixed, but permits other circuit constants to be varied, for achieving the same result. Furthermore, in the example shown, the resistance to discharge per unit length in main spark gap 20 is smaller than the corresponding resistance in the second spark gap, but this may not be a necessary condition because the resistance to discharge between electrodes also is a function of the distance between them. So if it should be desirable to reverse the situation described above and provide a substantially larger resistance per unit length in the main spark gap than exists in the second spark gap, the electrodes of the main spark gap or the circuit constants may be adjusted so that the over-all resistance to discharge in the main spark gap is less than the over-all resistance to discharge in the second spark gap. Finally, it may be possible and desirable under certain circumstances to design a high voltage component testing device which uses glow discharge tubes in place of spark gaps.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

Having thus described my invention, what I claim as new and desire to secure by Letters Patent is:

1. An apparatus for testing and measuring the voltage output of high voltage components in an automobile ignition system comprising first and second needle point electrodes, said electrodes mounted in spaced relation with the points of the electrodes facing each other to define a main spark gap, said first electrode adapted to be connected to a high voltage source from the component being tested, the other electrode at a lower potential, means for adjusting the spacing between the first and second electrodes to vary the length of the main spark gap, a radius point electrode mounted at a fixed distance from said high voltage electrode and at a lower potential defining a second spark gap, said radius point electrode positioned near enough to said high voltage electrode to cause a discharge in said second spark gap when said main spark gap fails to fire so that when the spacing between said needle point electrodes is increased to where misfires being to occur a discharge will occur in said second spark gap, a voltage dropping resistor and one terminal of a neon glow lamp connected in series to the radius point electrode, the other terminal of the neon glow lamp grounded whereby said neon glow lamp will flash each time a misfire occurs in the main spark gap, said means for adjusting the spacing between the first and second electrodes calibrated so that the length of the main spark gap at which misfires begin to occur can be determined precisely whereby the performance of the component being tested can be compared with the performance of a standard component.

2. Apparatus for testing and comparatively measuring the voltage output of high voltage components comprising:
   a fixed first electrode adapted to be connected to a high voltage output terminal of a high voltage component;
   a second electrode in spaced relation with said first electrode and defining therebetween a main discharge region, said second electrode adapted to be connected to comparatively low potential;
   means mounting said second electrode in adjustable manner whereby the length of said main discharge region may be varied;
   a scale indicating the relative length of said main discharge region; and
   a third electrode mounted at a fixed distance from said first electrode and adapted to be connected to comparatively low potential, whereby as the length of said main discharge region is increased the precise point of misfire therein is indicated by discharge between said first and third electrodes which remain at said fixed distance apart, and the scale reading of the main discharge region is compared to the reading for a standard high voltage component to indicate the performance of the component under test.

3. Apparatus for testing and comparatively measuring the voltage output of high voltage components comprising:
   a fixed electrode adapted to be connected to a high voltage output terminal of a high voltage component;
   a second electrode in spaced relation with said first electrode and defining therebetween a main discharge region, said second electrode adapted to be connected to comparatively low potential;
   said first and second electrodes pointed with the points facing each other;
   means mounting said second electrode in adjustable manner whereby the length of said main discharge region may be varied;
   a scale indicating the relative length of said main discharge region; and
   a third electrode mounted at a fixed distance from said first electrode and adapted to be connected to comparatively low potential, said third electrode of spherical shape, whereby as the length of said main discharge region is increased the precise point of misfire therein is indicated by discharge between said first and third electrodes which remain at said fixed distance apart, and the scale reading of the main discharge region is compared to the reading for a standard high voltage component to indicate the performance of the component under test.

References Cited in the file of this patent

UNITED STATES PATENTS

| | | |
|---|---|---|
| 1,991,451 | Elderkin | Feb. 19, 1935 |
| 2,317,263 | Eagan | Apr. 20, 1943 |
| 2,437,772 | Wall | Mar. 16, 1948 |
| 2,501,802 | Walker | Mar. 28, 1950 |
| 2,564,764 | Kovac | Aug. 21, 1951 |
| 2,603,685 | Bychinsky | July 15, 1952 |